US012110202B2

(12) United States Patent
Hamada et al.

(10) Patent No.: US 12,110,202 B2
(45) Date of Patent: Oct. 8, 2024

(54) PAPER SHEET STORAGE DEVICE AND PAPER SHEET PROCESSING DEVICE

(71) Applicant: GLORY LTD., Himeji (JP)

(72) Inventors: Takuro Hamada, Himeji (JP); Kei Isshiki, Himeji (JP)

(73) Assignee: GLORY LTD., Himeji (JP)

( * ) Notice: Subject to any disclaimer, the term of this patent is extended or adjusted under 35 U.S.C. 154(b) by 773 days.

(21) Appl. No.: 17/142,267

(22) Filed: Jan. 6, 2021

(65) Prior Publication Data

US 2021/0122598 A1 Apr. 29, 2021

Related U.S. Application Data

(63) Continuation of application No. PCT/JP2019/026539, filed on Jul. 3, 2019.

(30) Foreign Application Priority Data

Jul. 17, 2018 (JP) ................................ 2018-134416

(51) Int. Cl.
*B65H 29/00* (2006.01)
*G07D 11/13* (2019.01)
*G07D 11/14* (2019.01)

(52) U.S. Cl.
CPC ........... *B65H 29/006* (2013.01); *G07D 11/13* (2019.01); *G07D 11/14* (2019.01);
(Continued)

(58) Field of Classification Search
CPC ........ B65H 29/006; B65H 2301/41912; B65H 2701/1912; B65H 2404/264;
(Continued)

(56) References Cited

U.S. PATENT DOCUMENTS 4,106,766 A * 8/1978 Stefansson ............. B65H 29/44 271/181
4,145,016 A * 3/1979 Wiig ...................... G11B 15/43 242/351

(Continued)

FOREIGN PATENT DOCUMENTS

DE 102005044093 A1 3/2007
JP H08-67382 A 3/1996

(Continued)

OTHER PUBLICATIONS

International Search Report and Written Opinion mailed on Sep. 17, 2019 received for PCT Application No. PCT/JP2019/026539, Filed on Jul. 3, 2019, 6 pages including English Translation.

*Primary Examiner* — Michael R Mansen
*Assistant Examiner* — Henrix Soto
(74) *Attorney, Agent, or Firm* — XSENSUS LLP

(57) ABSTRACT

A sheet storage device includes a first reel that is disposed along a first axis and around which a first tape is wound; a second reel that is disposed along a second axis and around which a second tape is wound; a drum that is disposed along a third axis so as to wound a sheet, that is sandwiched between the first tape and the second tape at least partially overlapping each other, on an outer peripheral surface of the drum together with the first tape and the second tape; a first tape path between the first reel and the drum; a second tape path between the second reel and the drum; and a changing mechanism disposed in at least one of the first tape path or the second path, the changing mechanism changing a position of a corresponding tape to a direction parallel to the third axis.

20 Claims, 9 Drawing Sheets

(52) U.S. Cl.
CPC .............. *B65H 2301/41912* (2013.01); *B65H 2701/1912* (2013.01); *G07D 2211/00* (2013.01)

(58) Field of Classification Search
CPC .. B65H 2404/252; G07D 11/10; G07D 11/13; G07D 11/14; G07D 2211/00
USPC .......................................................... 242/528
See application file for complete search history.

(56) References Cited

U.S. PATENT DOCUMENTS

| | | | | | |
|---|---|---|---|---|---|
| 4,871,125 | A * | 10/1989 | Haueter | G07D 11/12 53/118 |
| 8,408,543 | B2 * | 4/2013 | Razzaboni | B65H 29/006 271/275 |
| 8,833,537 | B2 * | 9/2014 | Kashiwabuchi | B65H 29/006 312/34.1 |
| 9,016,457 | B2 * | 4/2015 | Suetaka | B65H 29/006 242/528 |
| 9,514,592 | B2 * | 12/2016 | Michels | B65H 29/006 |
| 2014/0090949 | A1 | 4/2014 | Suetaka | |
| 2018/0297801 | A1 | 10/2018 | Minamishin et al. | |
| 2020/0028876 | A1 † | 1/2020 | Cohen | |
| 2020/0231150 | A1 † | 7/2020 | Takahashi | |
| 2020/0320114 | A1 † | 10/2020 | Sparrow | |

FOREIGN PATENT DOCUMENTS

| | | | | |
|---|---|---|---|---|
| JP | 8-96191 | A | 4/1996 | |
| JP | 2003312906 | A * | 11/2003 | B65H 29/006 |
| JP | 2013-199365 | A | 10/2013 | |
| JP | 2016-3095 | A | 1/2016 | |
| JP | 2016003095 | A * | 1/2016 | |
| WO | WO-0125127 | A1 * | 4/2001 | B65G 15/14 |
| WO | WO-2017126129 | A1 * | 7/2017 | B65H 29/006 |
| WO | WO-2017203715 | A1 * | 11/2017 | B65H 29/006 |
| WO | WO-2018061149 | A1 * | 4/2018 | B65H 29/006 |

* cited by examiner
† cited by third party

PAPER SHEET STORAGE DEVICE AND PAPER SHEET PROCESSING DEVICE

CROSS-REFERENCE TO RELATED APPLICATIONS

This application is a bypass continuation of International Patent Cooperation Treaty Application No. PCT/JP2019/026539, filed on Jul. 3, 2019, which claims priority to Japanese Patent Application No. 2018-134416, filed on Jul. 17, 2018, the entire disclosures of each are incorporated herein by reference.

BACKGROUND

A conventional banknote depositing and dispensing machine includes a temporary storage unit. The temporary storage unit has a drum that allows banknotes to be wound thereon together with a tape. The temporary storage unit uses two sets of tapes, each set including a pair of a top tape and a bottom tape. In each set of tapes, the top tape and the bottom tape overlap each other so as to sandwich a banknote. Each tape is wound around a tape reel. The tape reels of one set are disposed in the temporary storage unit so as to oppose to each other in a vertical direction.

SUMMARY

An aspect of the present disclosure relates to a sheet storage device that includes a first reel that is disposed along a first axis and around which a first tape is wound; a second reel that is disposed along a second axis and around which a second tape is wound; a drum that is disposed along a third axis so as to wound a sheet, that is sandwiched between the first tape and the second tape at least partially overlapping each other, on an outer peripheral surface of the drum together with the first tape and the second tape; a first tape path between the first reel and the drum; a second tape path between the second reel and the drum; and a changing mechanism disposed in at least one of the first tape path or the second path, the changing mechanism changing a position of a corresponding tape to a direction parallel to the third axis

DETAILED DESCRIPTION OF THE DRAWINGS

Figure 1:
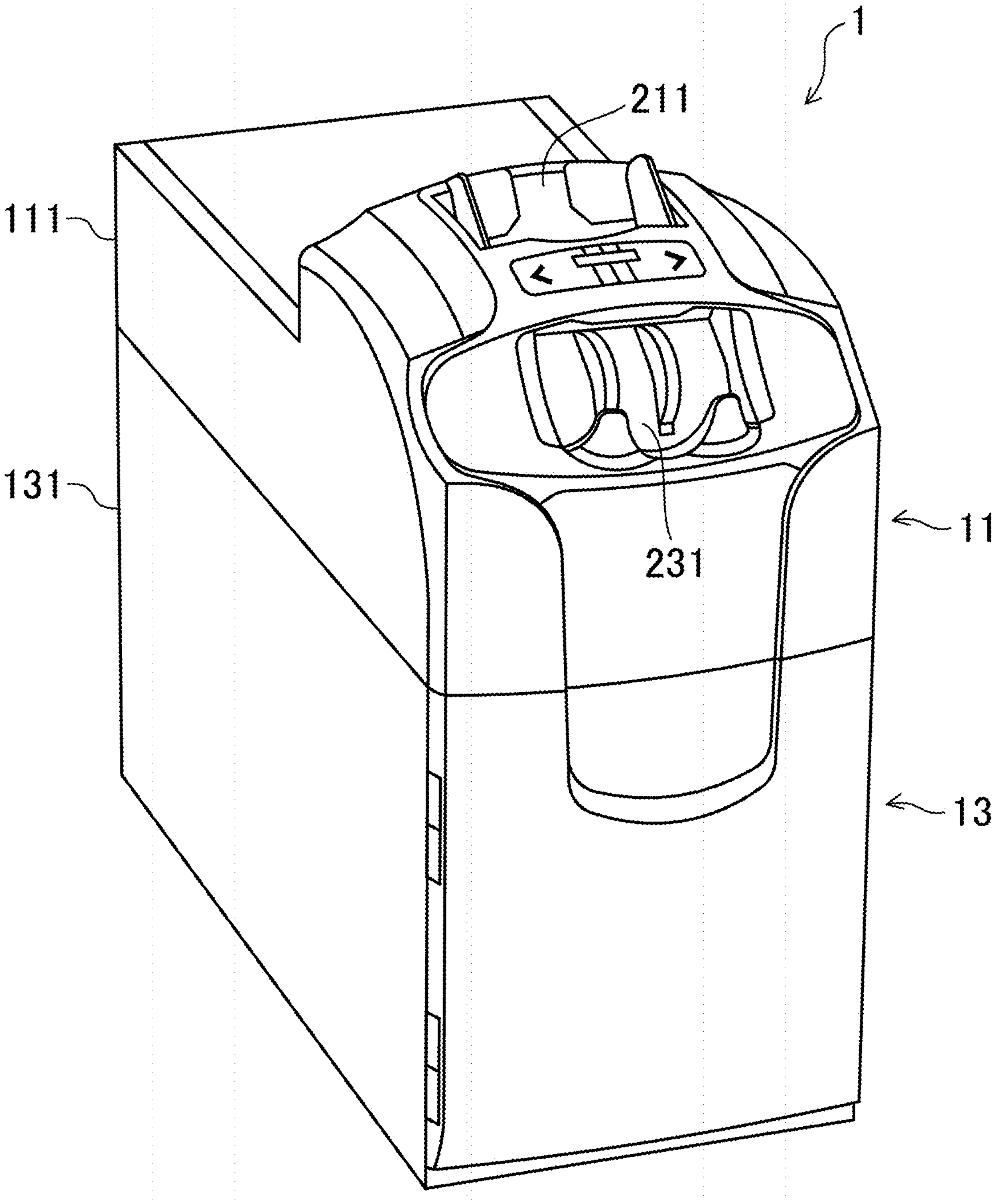
FIG. 1 is a perspective view illustrating an external appearance of a banknote handling apparatus.

Downsizing of a sheet storing unit (also referred to as a sheet storage device) such as the temporary storage unit mentioned above has been demanded. The inventors have found that to downsize a sheet storing unit requires a new configuration, different from that of a conventional sheet storing unit. The present disclosure relates to a downsized sheet storing unit and a sheet handling apparatus (also referred to as a sheet processing device).

In an exemplary configuration, a sheet storing unit disclosed herein includes a first reel that is disposed along a first axis and around which a first tape is wound; a second reel that is disposed along a second axis and around which a second tape is wound; a drum that is disposed along a third axis so as to wound a sheet, that is sandwiched between the first tape and the second tape at least partially overlapping each other, on an outer peripheral surface of the drum together with the first tape and the second tape; a first tape path between the first reel and the drum; a second tape path between the second reel and the drum; and a changing mechanism disposed in at least one of the first tape path or the second path, the changing mechanism changing a position of a corresponding tape to a direction parallel to the third axis.

This configuration allows saving of a space for disposing the first reel and the second reel. It is also advantageous for downsizing the sheet storing unit. In an exemplary configuration, the changing mechanism changes the position of the tape with respect to the direction parallel to the third axis. Thus, the first tape unwound from the first reel and the second tape unwound from the second reel at least partially overlap each other.

The first axis and the second axis may be aligned in a straight line. Further, the first axis and the second axis may be the same axis. These configurations allow further saving of the space for disposing the first reel and the second reel.

In an exemplary configuration, the changing mechanism may be disposed in the second tape path, and the second tape path may have a longer path length than the first tape path. This configuration allows the tape to change in position significantly in the direction parallel to the third axis even at a small inclination angle of the tape.

The second tape path may be provided so as to surround the drum. This configuration can increase the path length of the second tape path without an increase in size of the sheet storing unit.

The changing mechanism may have a guide pulley for guiding the tape; the first axis and the third axis may be parallel to each other, and the second axis and the third axis may be parallel to each other; and an axis of the guide pulley may be inclined with respect to the first axis, the second axis, and the third axis. This configuration allows the tape to change in position in the direction parallel to the third axis.

The guide pulley may include a first guide pulley and a second guide pulley that are disposed along a tape path at an interval from each other, and an axis of the first guide pulley and an axis of the second guide pulley may be disposed to be parallel with each other. This configuration allows the position of the tape before being wound on the first guide pulley and the position of the tape after being wound on the second guide pulley to be displaced in the direction parallel to the third axis.

The changing mechanism may have at least one crowned pulley for guiding the tape, and between the second reel and the drum, the crowned pulley may be displaced with respect to the second reel in the direction parallel to the third axis.

The crowned pulley has a function of correcting the running position of the tape so that the position of the tape is at the center of the crowned pulley. The crowned pulley, if disposed to be displaced with respect to the second reel in the direction parallel to the third axis, allows the second tape unwound from the second reel to be changed in position in the direction parallel to the third axis.

The single first reel and the single second reel may form a single set of reels, and the sheet storing unit may include a plurality of sets of reels.

By sandwiching a plurality of portions of a sheet between a plurality of sets of the first tape and the second tape, the sheet may be stably wound on the drum.

Two sets included in the plurality of sets of reels may be disposed so as to be symmetrical with respect to a plane perpendicular to the third axis and intersecting with a center of the drum. For example, the shape of the tape path included in the first set and the shape of the tape path included in the second set may be plane-symmetrical. Further, the pulley included in the first set and the pulley included in the second set may be plane-symmetrical. This configuration allows the two sets of the first and second tapes to sandwich a plurality of portions of a sheet symmetrically.

The first reel and the second reel may be disposed in the direction parallel to the third axis so as to be within a width of the drum in a direction of the third axis. This configuration can reduce an increase in size of the sheet storing unit.

In an exemplary configuration, the sheet storing unit disclosed herein further includes: a first reel around which a first tape is wound; a second reel that is disposed so as to be coaxial with the first reel, and around which a second tape is wound; a drum that allows a sheet sandwiched between the first tape and the second tape at least partially overlapping each other to be wound on an outer peripheral surface of the drum together with the first tape and the second tape; a first tape path between the first reel and the drum; and a second tape path between the second reel and the drum. This configuration is advantageous for downsizing the sheet storing unit, since the first reel and the second reel are disposed coaxially.

In an exemplary configuration, a sheet handling apparatus disclosed herein includes a storing unit for a sheet, wherein the storing unit includes a first reel around which a first tape is wound, a second reel around which a second tape is wound, a drum that allows a sheet sandwiched between the first tape and the second tape at least partially overlapping each other to be wound on an outer peripheral surface of the drum together with the first tape and the second tape, a first tape path between the first reel and the drum, and a second tape path between the second reel and the drum, the first reel and the second reel are displaced in a direction parallel to an axis of the drum, and the storing unit further includes a changing mechanism disposed in at least one of the first tape path or the second tape path, the changing mechanism changing a position of the tape to the direction parallel to the axis of the drum.

In an exemplary configuration, a sheet handling apparatus disclosed herein includes a storing unit for a sheet, wherein the storing unit includes a first reel around which a first tape is wound, a second reel that is disposed so as to be coaxial with the first reel, and around which a second tape is wound, a drum that allows a sheet sandwiched between the first tape and the second tape at least partially overlapping each other to be wound on an outer peripheral surface of the drum together with the first tape and the second tape, a first tape path between the first reel and the drum, and a second tape path between the second reel and the drum.

As can be seen from the foregoing description, the sheet storing unit described above is useful in downsizing a sheet storing unit. Further, the sheet handling apparatus described above has a compact storing unit and thus is useful in downsizing a sheet handling apparatus.

A sheet is an article in a shape of a sheet. The type of sheet is not particularly limited, and examples thereof include a banknote, a coupon, a check, securities, and the like. In addition to paper, the sheet may be made of synthetic paper using synthetic fibers as material, or a polymer sheet that is a synthetic resin sheet.

While the term "unit" is used in the present disclosure, it is done so in the context of the units being physical structures, and thus "unit" and "structure" may be used synonymously herein.

Embodiments of a sheet storing unit and a sheet handling apparatus will be described below with reference to the drawings. The following description is an example of a sheet storing unit and a sheet handling apparatus. FIG. 1 illustrates a banknote handling apparatus 1 as a sheet handling apparatus. The banknote handling apparatus 1 is installed in, for example, a financial institution, such as a bank, and performs various processes including a depositing process and a dispensing process. The banknote handling apparatus 1 may be installed not only in a financial institution, but also in a back office of a retail store, for example.

(General Configuration of Banknote Handling Apparatus)

Figure 2:
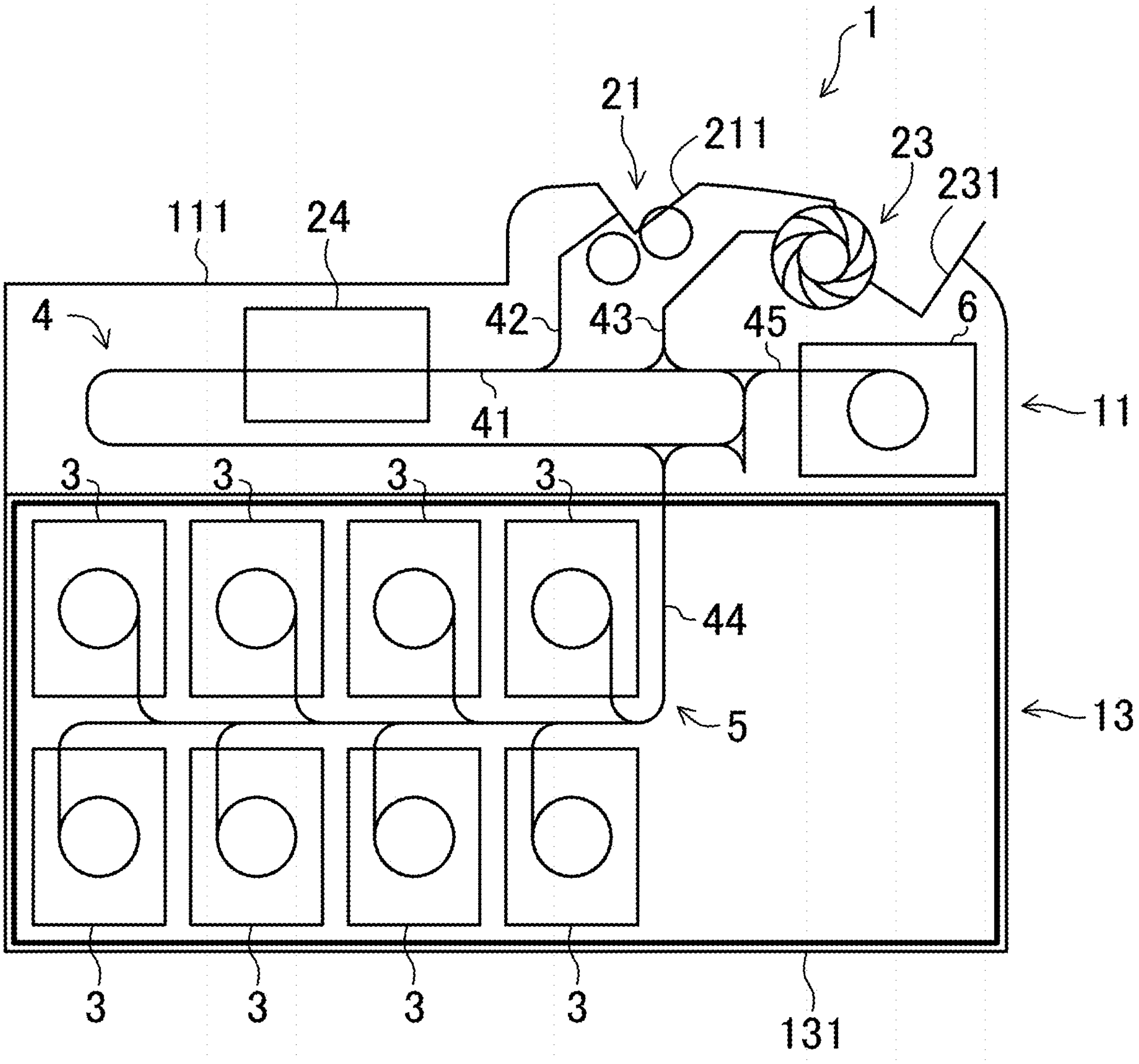
FIG. 2 is a schematic view illustrating an exemplary configuration of the banknote handling apparatus.

FIG. 1 illustrates an external appearance of the banknote handling apparatus 1. FIG. 2 illustrates an internal configuration of the banknote handling apparatus 1.

The banknote handling apparatus 1 handles loose notes. The banknote handling apparatus 1 includes an upper handling unit 11 and a lower safe unit 13. A depositing unit 21, a dispensing unit 23, a recognition unit 24, a temporary storage unit 6, and a part of a transport unit 4 are disposed in an upper housing 111 constituting the handling unit 11.

The safe unit 13 is comprised of a safe housing 131. A storing unit 5 and a part of the transport unit 4 are disposed inside the safe housing 131. The safe housing 131 is configured to protect the storing unit 5 at a security level equal to or higher than a predetermined level. The security level of the safe housing 131 is higher than that of the upper housing 111.

The depositing unit 21 is a portion of the apparatus where the banknotes are inserted, for example, in a depositing process. The depositing unit 21 has an inlet 211. The inlet 211 is open in an upper surface of the upper housing 111. The user inserts the banknotes into the depositing unit 21 via the inlet 211. The depositing unit 21 has a mechanism that takes the inserted banknotes one by one into the apparatus.

The dispensing unit 23 is a portion of the apparatus to which the banknotes are transported, for example, in a dispensing process. The dispensing unit 23 can be used for various applications. The dispensing unit 23 is configured to stack a plurality of banknotes. The dispensing unit 23 has an outlet 231. The outlet 231 is open in the upper surface of the upper housing 111. The user takes out the banknotes stacked in the dispensing unit 23 via the outlet 231. The outlet 231 may be provided with a shutter which opens and closes.

The recognition unit 24 is disposed in a loop transport path 41 which will be described later. The recognition unit 24 recognizes at least a denomination of each banknote being transported through the loop transport path 41, to determine whether each banknote is authentic or not, and whether each banknote is fit or unfit. In some implementations, the recognition unit 24 is an imaging device, such as a camera or sensor.

The temporary storage unit 6 is configured to be able to take and store the banknotes therein, and to feed the banknotes stored therein. The temporary storage unit 6 has a so-called tape-winding storing mechanism. The temporary storage unit 6 temporarily stores the banknotes to be deposited, for example, in the depositing process. When the depositing process is confirmed, the temporary storage unit 6 feeds the banknotes stored therein. The fed banknotes are stored in the storing unit 5 which will be described later. The temporary storage unit 6 can be used for various other applications.

The temporary storage unit 6 is disposed on a front side in the upper housing 111. The temporary storage unit 6 is detachably installed in the upper housing 111. The banknote handling apparatus 1 is capable of operating without the temporary storage unit 6.

The storing unit 5 has a plurality of banknote storing units 3. The banknote handling apparatus 1 shown in the drawing has eight banknote storing units 3. The banknote storing units 3 are vertically and horizontally aligned in the safe housing 131. Note that the banknote storing units 3 are not limited as to the number and arrangement thereof.

Each of the banknote storing units 3 is configured to be able to take and store the banknotes therein, and to feed the banknotes stored therein. The configuration of the banknote storing units 3 will be described later.

The transport unit 4 has a transport path. The transport unit 4 transports the banknotes along the transport path one by one at intervals, for example, with a long side of each banknote facing forward. The transport unit 4 is comprised of a combination of a large number of rollers, a plurality of belts, a motor for driving the rollers, and a plurality of guides.

The transport unit 4 has a loop transport path 41 provided in the upper housing 111. The loop transport path 41 passes through the recognition unit 24, as described above. The transport unit 4 transports the banknotes along the loop transport path 41 in the clockwise direction and the counterclockwise direction in FIG. 1.

The depositing unit 21 is connected to the loop transport path 41 via a connection path 42. The dispensing unit 23 is connected to the loop transport path 41 via a connection path 43.

Each of the plurality of banknote storing units 3 is connected to the loop transport path 41 via a connection path 44. The connection path 44 is diverged and connected to each of the plurality of banknote storing units 3. The temporary storage unit 6 is connected to the loop transport path 41 via a connection path 45.

A diverter for changing the destination of the banknotes is provided at a junction between the loop transport path 41 and each of the connection paths 42, 43, 44, and 45. Further, diverters are provided at respective branch points of the connection path 44.

A tracking sensor that detects the passage of the banknotes is provided for each of the loop transport path 41 and the connection paths 42, 43, 44, and 45. Receiving a command from a controller, the transport unit 4 controls the diverters of the transport unit 4 based on the detection signals of the tracking sensors to transport each banknote to a predetermined destination.

The controller may be realized by executable instructions of software and specialized hardware. In particular, the controller is implemented using circuitry or processing circuitry which includes general purpose processors, special purpose processors, integrated circuits. ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor. Further details of the controller are described in reference to FIG. 9.

It will be briefly described below how the banknote handling apparatus 1 performs the depositing process and the dispensing process.

(Depositing Process)

The user inserts the banknotes to be deposited into the depositing unit 21. The depositing unit 21 takes the banknotes one by one into the apparatus. The transport unit 4 transports the banknotes to the recognition unit 24 through the connection path 42 and the loop transport path 41. The recognition unit 24 recognizes the banknotes. The transport unit 4 transports the banknote that has passed through the recognition unit 24 to any one of the plurality of banknote storing units 3, via the connection path 44. The banknote storing units 3 store the banknotes. The depositing process ends when all the banknotes that can be deposited are stored in the banknote storing units 3.

In the case of using the temporary storage unit 6 during the depositing process, the transport unit 4 transports the banknotes that have passed through the recognition unit 24 to the temporary storage unit 6 via the connection path 45. The temporary storage unit 6 stores the banknotes. After the depositing amount is confirmed, the temporary storage unit 6 feeds the banknotes stored therein. The transport unit 4 transports the banknote fed by the temporary storage unit 6 to any one of the plurality of banknote storing units 3, via the connection path 44.

(Dispensing Process)

During dispensing process, the banknote storing units 3 feed the banknotes to be dispensed. The transport unit 4 transports the banknotes fed by the banknote storing units 3 to the recognition unit 24 through the connection path 44 and the loop transport path 41. The recognition unit 24 recognizes the banknotes. After the recognition of the banknotes, the transport unit 4 transports the banknotes to the dispensing unit 23 through the loop transport path 41 and the connection path 43. The dispensing process ends when all the banknotes to be dispensed are dispensed to the dispensing unit 23.

(Configuration of Banknote Storing Unit)

Figure 3:
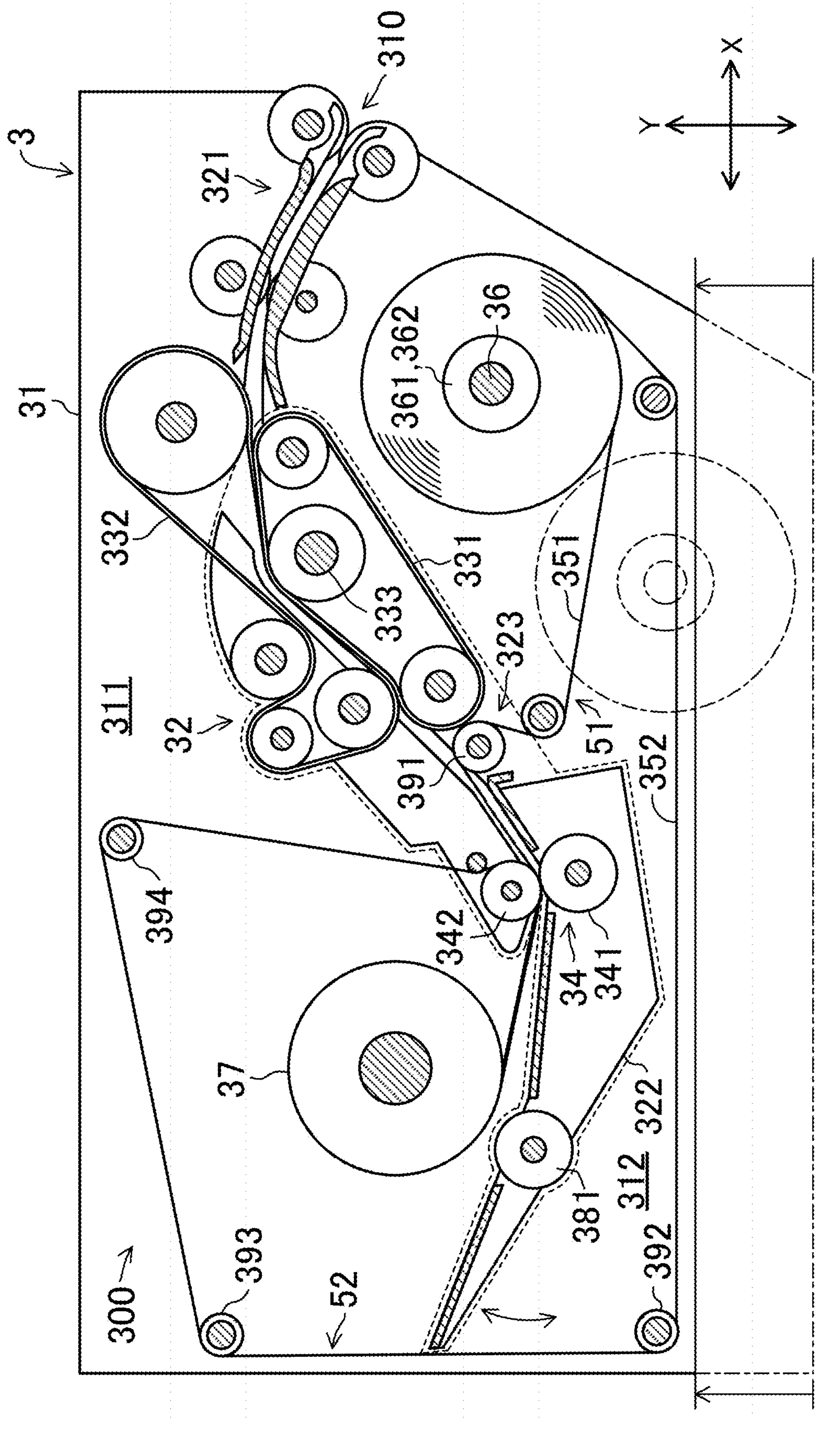
FIG. 3 is a cross-sectional view illustrating an exemplary configuration of a banknote storing unit.
Figure 4:
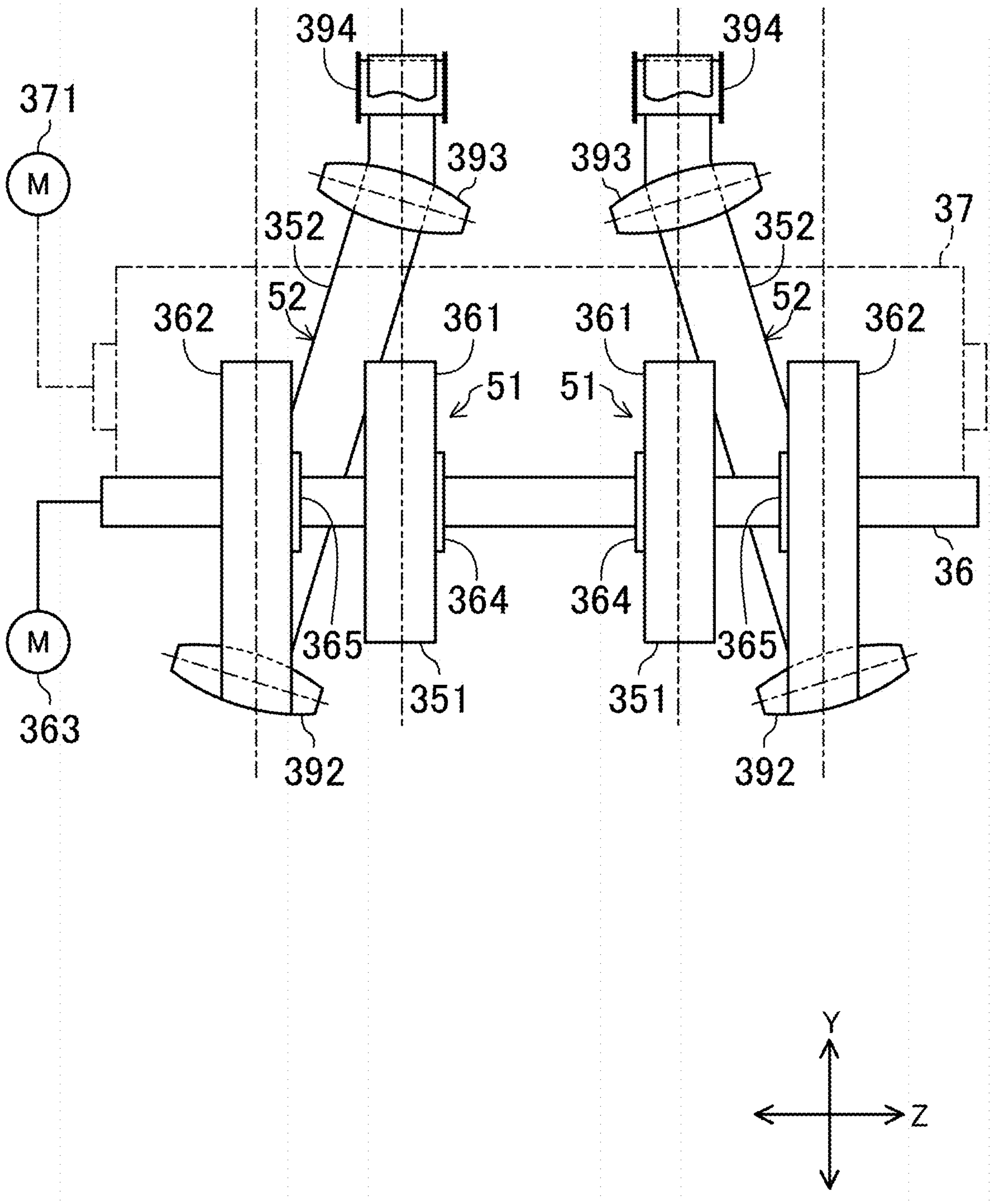
FIG. 4 illustrates an exemplary configuration of a tape path in the banknote storing unit of FIG. 3.
Figure 5:
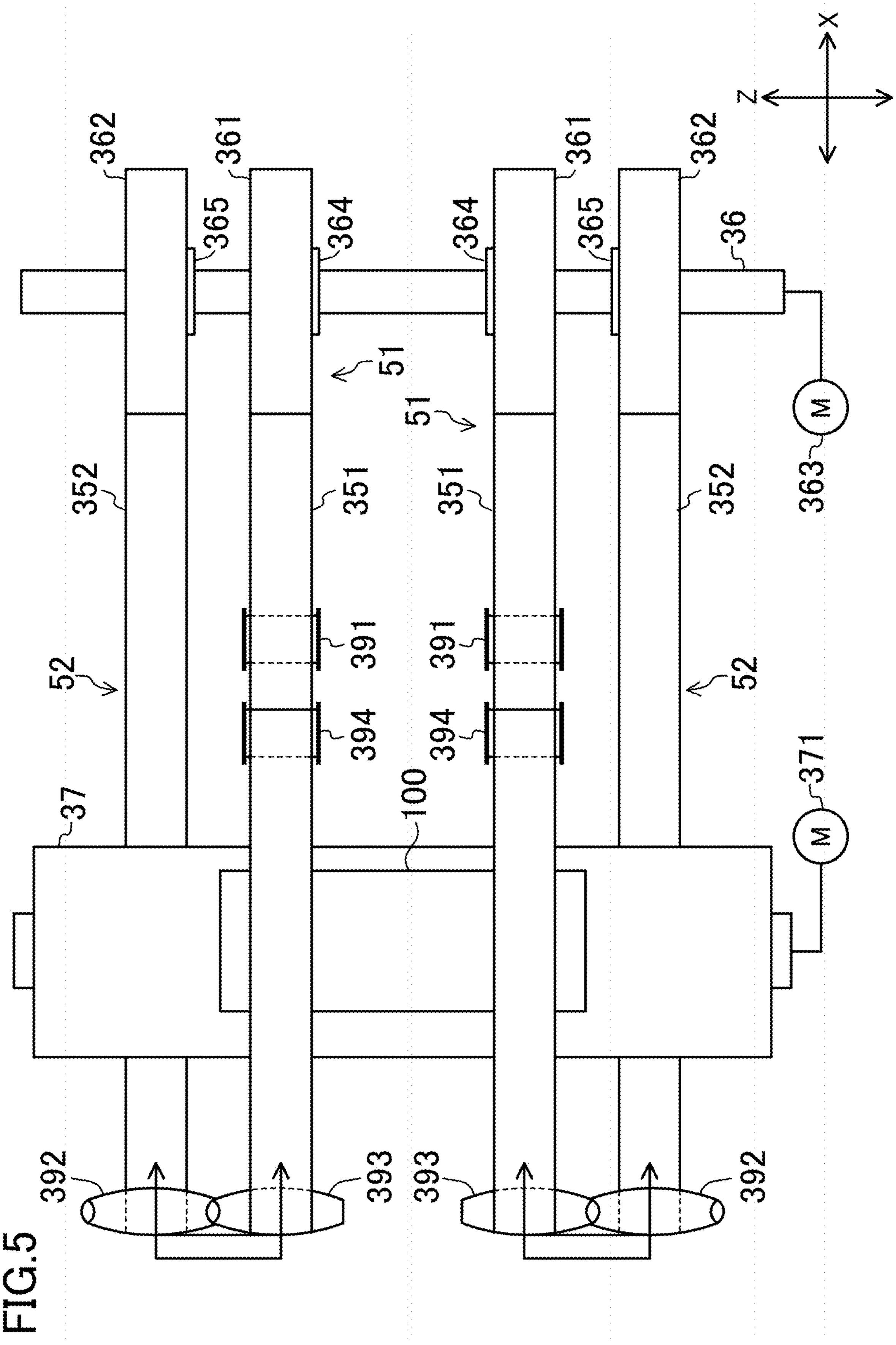
FIG. 5 illustrates another exemplary configuration of a tape path in the banknote storing unit of FIG. 3.

FIGS. 3 to 5 illustrate an example configuration of the banknote storing unit 3. FIG. 3 illustrates the banknote storing unit 3 when the stored amount is zero (that is, when the banknote storing unit 3 stores no banknotes). FIGS. 4 and 5 illustrate an arrangement configuration of a reel and a tape in the banknote storing unit 3. For convenience of explanation, in the following description, the side-to-side direction in FIG. 3 is referred to as the X direction; the up-and-down direction in FIG. 3 is referred to as the Y direction; and the direction orthogonal the paper of FIG. 3 is referred to as the Z direction. FIG. 4 corresponds to the side view of the interior of the banknote storing unit 3 seen from the right side (in the X direction) of FIG. 3. FIG. 5 corresponds to the plan view of the interior of the banknote storing unit 3 seen from the upper side (in the Y direction) of FIG. 3.

An outlet/inlet 310 for depositing and dispensing banknotes is provided on one side surface (right surface in the example shown in FIG. 3) of the banknote storing unit 3. The banknotes are inserted into the banknote storing unit 3 through the outlet/inlet 310 and are drawn out from the banknote storing unit 3 through the outlet/inlet 310.

The banknote storing unit 3 includes a storing mechanism 300 and a frame 31 accommodating the storing mechanism 300. The storing mechanism 300 is configured to wind a banknote 100 on a drum 37 together with tapes sandwiching the banknote 100 therebetween (see FIG. 5). The storing mechanism 300 includes a first reel 361, a second reel 362, a drum 37, and a transport guide 32 that constitutes a transport path of the banknote 100.

The transport guide 32 is disposed inside the frame 31 between the outlet/inlet 310 and the drum 37. The transport guide 32 extends in the X direction. The transport guide 32 divides the inside of the frame 31 into a first region 311 and a second region 312.

One end of a first tape 351 is fixed to the first reel 361, and the first tape 351 is wound around the first reel 361. One end of a second tape 352 is fixed to the second reel 362, and the second tape 352 is wound around the second reel 362. The other end of the first tape 351 and the other end of the second tape 352 are fixed to an outer peripheral surface of the drum 37.

The first reel 361 and the second reel 362 are disposed in the second region 312. Only one reel is shown in FIG. 3. This is because, as shown in FIGS. 4 and 5, the first reel 361 and the second reel 362 are displaced in the Z direction (i.e., in a direction parallel to an axis of the drum 37) and are disposed in the same location in the X direction and the Y direction (i.e., in a radial direction of the reel). An axis of the first reel 361 and an axis of the second reel 362 are aligned in a straight line.

Two first reels 361 are disposed in the Z direction at a first interval from each other. Likewise, two second reels 362 are disposed in the Z direction at a second interval from each other. Consequently, in the banknote storing unit 3, the four reels in total have their axes aligned in a straight line.

One first reel 361 and one second reel 362 that are disposed on the left side in FIG. 4 form a set of reels. In this set of reels, the first reel 361 is disposed closer to the center in the Z direction of the banknote storing unit 3, and the second reel 362 is disposed outside in the Z direction with respect to the first reel 361. Likewise, one first reel 361 and one second reel 362 that are disposed on the right side in FIG. 4 form a set of reels. In this set of reels, the first reel 361 is disposed closer to the center in the Z direction of the banknote storing unit 3, and the second reel 362 is disposed outside in the Z direction with respect to the first reel 361. Therefore, the first interval is shorter than the second interval. All of the four reels are arranged within the width of the drum 37 in the Z direction.

The first reel 361 rotates in the unwinding direction of the first tape 351 (clockwise direction in FIG. 3) and in the winding direction of the first tape 351 (a counterclockwise direction in FIG. 3), about the axis (corresponding to a first axis) that extends in the Z direction. The first tape 351 is unwound from each of the two first reels 361. Likewise, the second reel 362 rotates in the unwinding direction of the second tape 352 (clockwise direction in FIG. 3) and in the winding direction of the second tape 352 (a counterclockwise direction in FIG. 3), about the axis (corresponding to a second axis) that extends in the Z direction. The second tape 352 is unwound from each of the two second reels 362. The second tape 352 unwound from the second reel 362 is displaced in the Z direction with respect to the first tape 351.

The two first reels 361 and the two second reels 362 are supported on one shaft 36 extending in the Z direction, as shown in FIGS. 4 and 5. An electric motor 363 for rotating the first reels 361 and the second reels 362 is connected to the shaft 36. The shaft 36 constitutes the axes of the two first reels 361 and the axes of the two second reels 362. That is, the axes of the two first reels 361 and the axes of the two second reels 362 are the same axis.

A torque limiter 364 is attached to each of the two first reels 361. The torque limiters 364 adjust the tension of the first tapes 351. A torque limiter 365 is attached to each of the two second reels 362, as well. The torque limiters 365 adjust the tension of the second tapes 352.

The axes of the four reels are not necessarily configured as one shaft. For example, the axis of the set of reels consisting of one first reel 361 and one second reel 362 on the left side in FIG. 4 may be configured as one shaft, and the axis of the other set of reels consisting of one first reel 361 and one second reel 362 on the right side in FIG. 4 may be configured as another shaft. Alternatively, the axes of the two first reels 361 positioned closer to the center in the Z direction may be configured as one shaft, and the axes of the second reels 362 disposed outside in the Z direction with respect to the first reels 361 may be configured independently as different shafts. Moreover, the axes of the four reels may be configured as independent shafts.

The transport guide 32 consists of a fixed guide 321 and a movable guide 322. The fixed guide 321 is connected to the outlet/inlet 310. The fixed guide 321 is comprised of a pair of rollers that sandwich the banknote 100 in its the thickness direction, and a guide member. The fixed guide 321 is configured to transport the banknote 100 toward the drum 37 or toward the outlet/inlet 310.

The movable guide 322 is connected to the fixed guide 321. The movable guide 322 corresponds to the portion surrounded by the dashed line in FIG. 3. The movable guide 322 is configured to turn on a rotary shaft 333 of a roller, which will be described later (see the double-headed arrow on the left side in FIG. 3). The movable guide 322 is biased in the clockwise direction in FIG. 3 by a biasing member (e.g., a spring). The movable guide 322 turns in the clockwise direction and in the counterclockwise direction, in accordance with the size of the diameter of the drum 37 that will be described later. The size of the diameter of the drum 37 described herein means the outermost diameter expanded by the tapes and banknotes if the tapes and banknotes are wrapped around the drum 37.

The movable guide 322 has a first belt 331 and a second belt 332. The first belt 331 is wound on a plurality of rollers. The second belt 332 is wound on a plurality of rollers different from the rollers the first belt 331 is wound on. The first belt 331 and the second belt 332 face each other along the transport path of the banknote 100 so as to sandwich the banknote 100 in its thickness direction. The first belt 331 and the second belt 332 are configured to transport the banknote 100 toward the drum 37 or toward the outlet/inlet 310.

The first tape 351 unwound from the first reel 361 runs along a first tape path 51 to reach the drum 37. The second tape 352 unwound from the second reel 362 runs along a second tape path 52 to reach the drum 37. The first tape path 51 is comprised of a movable pulley 391 and a pulley pair 34, which will be described later. The second tape path 52 is comprised of guide pulleys 392, 393, and 394 and the pulley pair 34, which will be described later.

A communication portion 323 communicating the first region 311 and the second region 312 is provided at an intermediate portion of the movable guide 322. The movable pulley 391 is disposed in the communication portion 323. The movable pulley 391, along with the movable guide 322, turns on the rotary shaft 333.

The pulley pair 34 is disposed at the end of the transport path provided in the movable guide 322. The pulley pair 34 is comprised of a first pulley 341 and a second pulley 342. The first pulley 341 and the second pulley 342 are disposed so as to oppose each other. The second pulley 342 guides the first tape 351 and the second tape 352 toward the outer peripheral surface of the drum 37. The first pulley 341 and the second pulley 342 apply the transporting force to the banknote sandwiched between the first tape 351 and the second tape 352.

The first tape 351 extends to the first pulley 341 via the movable pulley 391. Between the movable pulley 391 and the first pulley 341, the first tape 351 runs along the transport path of the banknote 100.

The second tape 352 unwound from the second reel 362 is guided to the first region 311 so as to bypass the movable guide 322. The second tape path 52 is provided so as to surround the periphery of the drum 37. The second tape path 52 is comprised of a plurality of guide pulleys. In the example configuration shown in FIG. 3, the guide pulleys include a first guide pulley 392, a second guide pulley 393, and a third guide pulley 394. Note that the guide pulleys may include two guide pulleys, or may include four pulleys or more.

In the example configuration shown in FIG. 3, the first guide pulley 392 is disposed in the second region 312 in an area farthest from the outlet/inlet 310. As shown in FIG. 4, the first guide pulley 392 is positioned in the same or roughly the same location as the second reel 362, with respect to the Z direction. As shown in FIGS. 4 and 5, an axis of the first guide pulley 392 is inclined with respect to the axes of the first reel 361 and the second reel 362 The first guide pulley 392 changes the running direction of the second tape 352, which is unwound from the second reel 362 straight in the X direction, from the X direction to the Y direction (specifically, to a direction inclined with respect to the Y direction).

In the example configuration shown in FIG. 3, the second guide pulley 393 is disposed in the first region 311 in an area farthest from the outlet/inlet 310. As shown in FIG. 4, the second guide pulley 393 is positioned in the same or roughly the same location as the first reel 361, with respect to the Z direction. An axis of the second guide pulley 393 is inclined with respect to the axes of the first reel 361 and the second reel 362. The second guide pulley 393 changes the running direction of the second tape 352 from the Y direction (specifically, a direction inclined with respect to the Y direction) to approximately the X direction.

As described above, the axes of the first guide pulley 392 and the second guide pulley 393 are inclined with respect to the axes of the first reel 361 and the second reel 362.

Specifically, the axis of the first guide pulley 392 is orthogonal to the X direction and is not orthogonal to the Y direction and the Z direction. The axis of the first guide pulley 392 is inclined such that its outer side in the Z direction is positioned higher than its center side in the Z direction. Consequently, the axis of the first guide pulley 392 disposed on the left side in FIG. 4 is inclined so as to descend to the right side, and the axis of the first guide pulley 392 disposed on the right side in FIG. 4 is inclined so as to ascend to the right side.

The axis of the second guide pulley 393 is parallel to the axis of the first guide pulley 392. Thus, the axis of the second guide pulley 393 is orthogonal to the X direction and is not orthogonal to the Y direction and the Z direction. Further, the axis of the second guide pulley 393 is inclined such that its outer side in the Z direction is positioned higher than its center side in the Z direction. The axis of the second guide pulley 393 disposed on the left side in FIG. 4 is inclined so as to descend to the right side, and the axis of the second guide pulley 393 disposed on the right side in FIG. 4 is inclined in so as to ascend to the right side.

The second tape 352 unwound from the second reel 362 is wound on the first guide pulley 392 and the second guide pulley 393. Hence, its position in the Z direction changes from the position of the second reel 362 to the position of the first reel 361 (see the arrows in FIG. 5). Further, the second tape 352 unwound from the drum 37 is wound on the second guide pulley 393 and the first guide pulley 392. Hence, its position in the Z direction changes from the position of the first reel 361 to the position of the second reel 362, opposite to the above. The first guide pulley 392 and the second guide pulley 393 are disposed in parallel to each other in the second tape path 52 and comprise a changing mechanism for changing the position of the second tape 352 in the direction parallel to the axis of the drum 37. Between the second reel 362 and the first guide pulley 392, the running direction of the second tape 352 is parallel to a plane perpendicular to the axis of the drum 37. Between the first guide pulley 392 and the second guide pulley 393, the running direction of the second tape 352 is inclined with respect to the plane perpendicular to the axis of the drum 37. The inclination direction is a direction in which the tape path of the second tape 352 approaches the tape path of the first tape 351.

Since the first guide pulley 392 and the second guide pulley 393 are disposed in parallel to each other, the tensile force acting on the right and left end portions in the width direction of the second tape 352 may be balanced. Such a configuration allows stable running of the second tape 352 in changing, by the changing mechanism, the position of the second tape 352 in the Z direction.

The first guide pulley 392 and the second guide pulley 393 are crowned pulleys. That means, the surfaces of each of the first guide pulley 392 and the second guide pulley 393 which are in contact with the second tape 352 have a crowned shape where a center portion is bulged with respect to both ends of the pulley in its width direction. The crowned pulley has a function of moving the running position of the tape toward the center side. Although the first guide pulley 392 and the second guide pulley 393 change the running position of the tape in the Z direction as described above, it is possible to make the tape run stably by moving the running position of the tap toward the center side in each of the first guide pulley 392 and the second guide pulley 393. Note that the first guide pulley 392 and the second guide pulley 393 may be crowned pulleys with flanges.

In the example configuration shown in FIG. 3, the third guide pulley 394 is disposed in the upper portion of the first region 311, close to a central position in the X direction. As shown in FIG. 4, the third guide pulley 394 is positioned in the same or roughly the same location as the first reel 361, with respect to the Z direction. Therefore, the second tape 352 wound on the third guide pulley 394 is located at the same position as the first tape 351 in the Z direction. The third guide pulley 394 changes the running direction of the second tape 352 from the X direction to the Y direction. The third guide pulley 394 is configured as, for example, a flat pulley having a pulley surface with flanges. The third guide pulley 394 may be a crowned pulley like the first guide pulley 392 and the second guide pulley 393. Between the second guide pulley 393 and the third guide pulley 394, the running direction of the second tape 352 is parallel to a plane perpendicular to the axis of the drum 37.

After being wound on the third guide pulley 394, the second tape 352 extends to the second pulley 342. At this position of the second pulley 342, the second tape 352 is located at the same position as the first tape 351 in the Z direction. The second pulley 342 guides the second tape 352 toward the outer peripheral surface of the drum 37 such that the second tape 352 overlaps with the first tape 351.

A pressing roller 381 is attached to a distal end portion of the movable guide 322. The movable guide 322 constitutes a roller support supporting the pressing roller 381. The pressing roller 381 abuts on the first tape 351 and the second tape 352 which are wound around the drum 37. The pressing roller 381 presses the first tape 351 and the second tape 352. Associated with the turning of the movable guide 322, the pressing roller 381 changes its relative position with respect to the center of the drum 37. The position of the pressing roller 381 changes in accordance with the size of the diameter of the drum 37.

The drum 37 is disposed in the first region 311. Specifically, the drum 37 is disposed in the first region 311 at a position away from the outlet/inlet 310.

The drum 37 rotates about an axis (i.e., corresponding to the third axis) extending in the Z direction. The axis of the drum 37 is parallel to the axes of the first reels 361 and the second reels 362. The drum 37 rotates in the winding direction of the banknote 100 and the tapes, and in a feeding direction of the banknote 100 and the tapes. In FIG. 3, the winding direction of the banknote 100 and the tapes is the clockwise direction, and the feeding direction of the banknote 100 and the tapes is the counterclockwise direction. As shown in FIGS. 4 and 5, an electric motor 371 for rotating the drum 37 is connected to the drum 37.

The banknote 100 is sandwiched between the first tape 351 and the second tape 352 at the position of the pulley pair 34. At this time, portions of the banknote 100 adjacent to the longitudinal ends of the banknote 100 are each sandwiched between the first tape 351 and the second tape 352. After passing through the pulley pair 34, the banknote 100 sandwiched between the first tape 351 and the second tape 352 is wound around the outer peripheral surface of the drum 37 together with the first tape 351 and the second tape 352. The first tape 351 and the second tape 352 are layered on each other on the outer peripheral surface of the drum 37.

In the banknote storing unit 3, the banknote 100, the first tape 351, and the second tape 352 are wound around the drum 37, with the banknote 100 sandwiched between the first tape 351 and the second tape 352 that are layered on each other. The banknote storing unit 3 can therefore achieve stable winding of the banknote 100 on the drum 37. Further, the storing mechanism 300 of this configuration has two sets of tapes, each set comprised of one first tape 351 and one second tape 352. The two sets of tapes are arranged so as to be symmetrical with respect to the plane perpendicular to the axis of the drum 37 and intersecting with the center of the drum 37. The first tapes 351 and the second tapes 352 of the respective set of tapes sandwich the portions of the banknote 100 which are adjacent to the longitudinal ends of the banknote 100. In this way, the banknote 100 may be stably wound on the drum 37.

In a conventional banknote storing unit, the first reel and the second reel have been disposed at the same positions in the Z direction so as to layer the first tape and the second tape on each other. Thus, as indicated by a dot-dash line in FIG. 3, the first reel and the second reel needed to be displaced in the X and Y directions so as not to interfere with each other. Further, the widths of the first reel and the second reel in the axial direction are smaller than the width of the drum in the axial direction. Thus, the space adjacent to each of the first reel and the second reel in the axial direction is left unused and wasted. Further, the diameters of the first reel and the second reel increase when tapes are wound around the reels. To prevent the first reel and the second reel from interfering with each other, in the conventional banknote storing unit, there needed a great interval between the first reel and the second reel in the radial direction. As a result, it has been difficult to downsize the conventional banknote storing unit.

As a countermeasure, in the banknote storing unit 3 disclosed herein, the first reels 361 and the second reels 362 are disposed coaxially, as described above. That is, the first reels 361 and the second reels 362 are displaced in the Z direction and disposed in the same position in the X direction and the Y direction. For this reason, in the banknote storing unit 3, it is possible to save the space where the first reels 361 and the second reels 362 are disposed, and as indicated by the up-pointing arrows in FIG. 3, to downsize the banknote storing unit 3 as compared to the conventional banknote storing unit.

Further, although the four reels are aligned in the Z direction, the width of the first reels 361 and the second reels 362 is smaller than the width of the drum 37. Thus, all of the four reels, even if aligned in the Z direction, can be arranged within the width of the drum 37 in the Z direction (see FIGS. 4 and 5). Consequently, an increase in size of the banknote storing unit 3 in the Z direction may be avoided.

Since the first reels 361 and the second reels 362 are displaced in the Z direction, the first tape 351 unwound from the first reel 361 and the second tape 352 unwound from the second reel 362 are displaced in the Z direction. In this situation, the first tape 351 and the second tape 352 do not overlap. However, in the banknote storing unit 3, the first guide pulley 392 and the second guide pulley 393 serving as the changing mechanism change the position of the second tape 352 in the Z direction. The second tape path 52 extends in a direction perpendicular to the axis of the drum 37 at least shortly after the tape is unwound from the second reel 362 or shortly before the tape is wound on the drum 37. The changing mechanism causes at least a part of the second tape path 52 to incline with respect to the plane perpendicular to the axis of the drum 37. A traveling direction of the second tape 352 is perpendicular to the axis of the drum 37 at least shortly after the tape is unwound from the second reel 362 or shortly before the tape is wound on the drum 37. The changing mechanism causes the traveling direction of the second tape 352 to incline with respect to the plane perpendicular to the axis of the drum 37, in at least a part of the section between the drum 37 and the second reel 362.

The first tape 351 and the second tape 352 are layered on each other, thereby making it possible to sandwich therebetween the banknote 100 stably. The banknote 100 may be stably wound on the drum 37.

To feed the banknote 100 wound on the drum 37, the first tape 351 and the second tape 352 are fed from the drum 37 and wound around the first reel 361 and the second reel 362. At this time, the position of the second tape 352 is changed in the Z direction from the position where the second tape 352 and the first tape 351 are layered on each other, due to passing of the second tape 352 through the second guide pulley 393 and the first guide pulley 392. The second tape 352 is wound around the second reel 362 that is displaced in the Z direction with respect to the first reel 361.

As shown in FIG. 3, the second tape path 52 is provided so as to surround the periphery of the drum 37. The second tape path 52 has a longer path length than the first tape path 51. The changing mechanism inclines the winding direction of the second tape 352, thereby changing the position of the second tape 352 in the Z direction. The longer path length allows the second tape 352 to change in position significantly in the Z direction even at a small inclination angle of the second tape 352. The second tape 352 runs stably if the inclination angle of the second tape 352 is small. Thus, the longer second tape path 52 allows the second tape 352 to change in position in the Z direction while keeping the second tape 352 running stably.

Further, providing the second tape path 52 so as to surround the periphery of the drum 37 can increase the path length of the second tape path 52 without an increase in size of the banknote storing unit 3.

Figure 6:
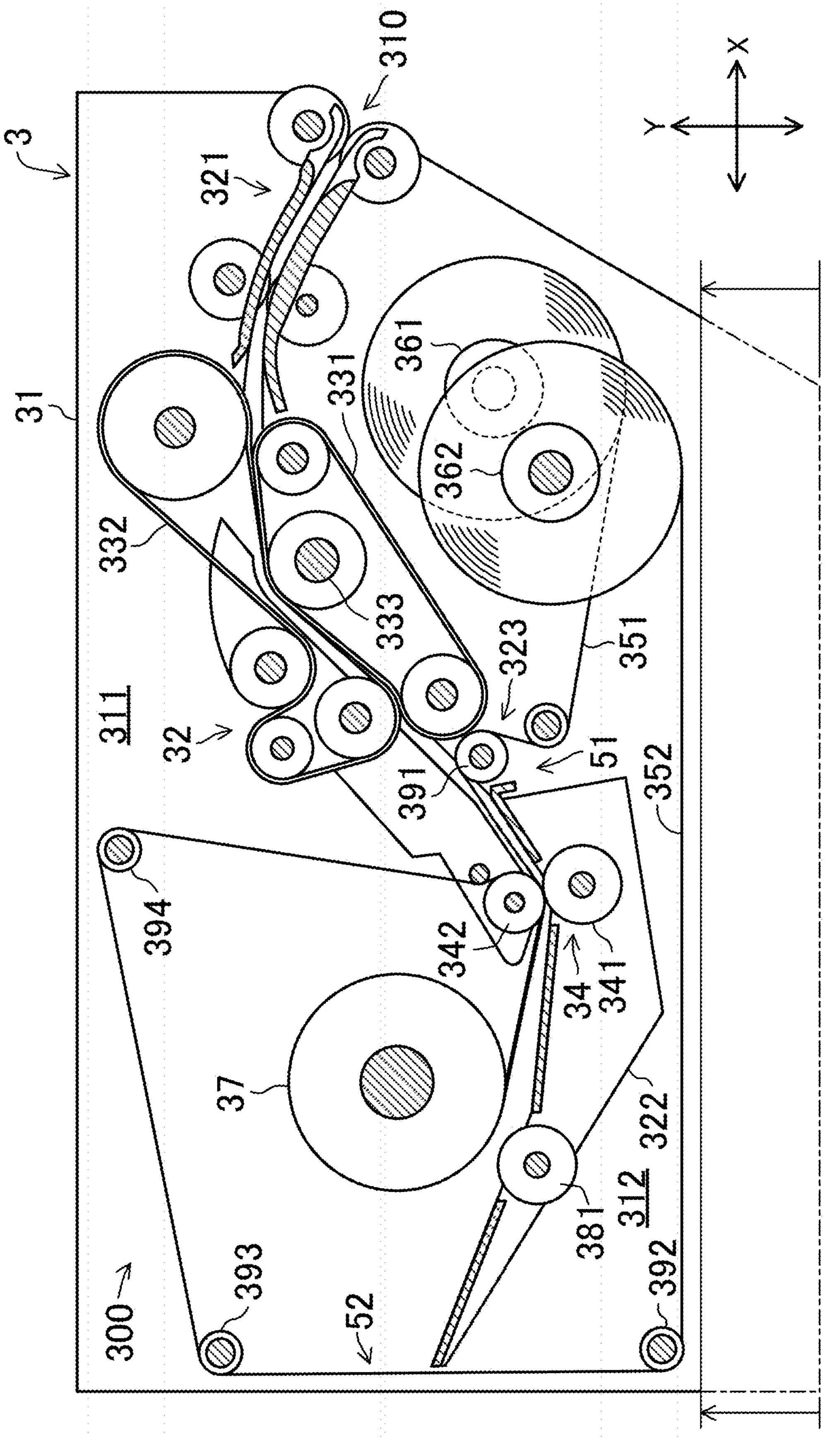
FIG. 6 is a diagram illustrating a variation of the banknote storing unit.

In the above-described configuration, the first reel 361 and the second reel 362 are arranged so as to be coaxial with one another. However, the first reel 361 and the second reel 362 may be not arranged coaxially. For example, as shown in FIG. 6, the first reel 361 and the second reel 362 may be arranged so as to at least partially overlap each other in the reel's radial direction. The banknote storing unit 3 of this configuration, as well, may be downsized as compared to a conventional banknote storing unit (see the up-pointing arrows in FIG. 6).

(Second Example Configuration of Changing Mechanism)

In the above embodiment, the changing mechanism is comprised of the first guide pulley 392 and the second guide pulley 393 inclined with respect to the axes of the reels and the drum. The changing mechanism is not limited to this configuration.

Figure 7:
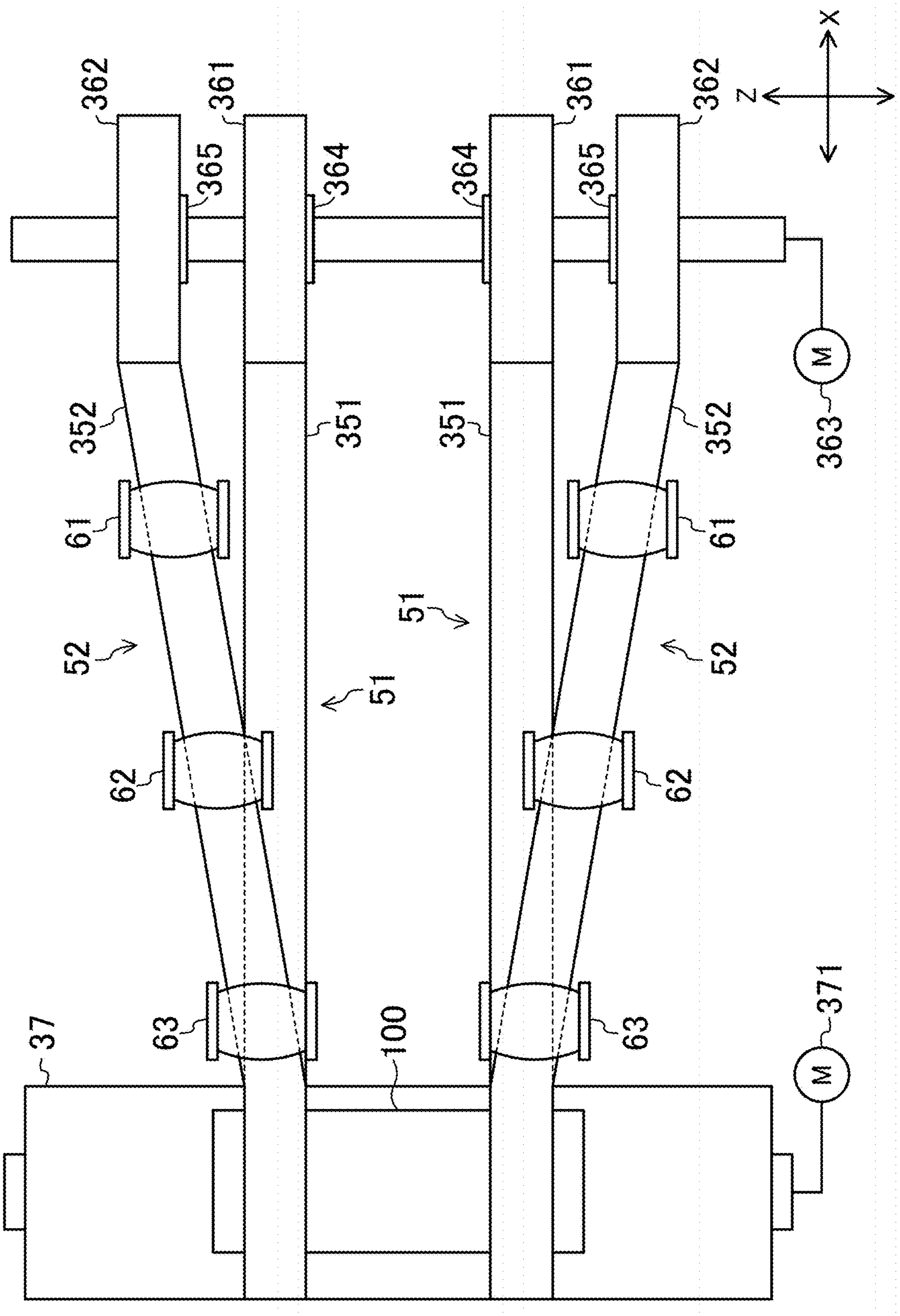
FIG. 7 is a diagram illustrating a variation of the tape path in the banknote storing unit.

FIG. 7 illustrates a second example configuration of the changing mechanism. In FIG. 7, the configurations that are the same as those shown in FIG. 5 are indicated with the same reference characters. The changing mechanism is comprised of crowned pulleys 61, 62, and 63. In the example configuration of FIG. 7, the changing mechanism includes a plurality of crowned pulleys, that is, the first crowned pulleys 61, the second crowned pulleys 62, and the third crowned pulleys 63.

Between each of the second reels 362 from which the second tapes 352 are unwound and the drum 37, the first to third crowned pulleys 61, 62, and 63 are displaced in the Z direction with respect to the second reel 362. Specifically, the first to third crowned pulleys 61, 62, and 63 are disposed in order at predetermined intervals, from each of the second reels 362 to the drum 37 in the X direction. The first crowned pulley 61 is disposed at a position closest to the associated one of the second reels 362 in the Z direction. The second crowned pulley 62 is disposed at a position farther from the associated one of the second reels 362 in the Z direction than the first crowned pulley 61. The third crowned pulley 63 is disposed at a position farther from the associated one of the second reels 362 in the Z direction than the second crowned pulley 62. The third crowned pulley 63 is disposed at a position closest to the associated one of the first reels 361 in the Z direction.

As described above, the crowned pulleys have a function of moving the running position of the tape toward the center side in the width direction of the respective pulleys. Each of the crowned pulleys 61, 62, and 63 that are displaced in the Z direction brings the running position of the second tape 352 to the center side of the pulley. Thus, the running position of the second tape 352 gradually changes in the Z direction from the second reel 362 to the drum 37. Thus, although the first reel 361 and the second reel 362 are displaced in the Z direction, the first tape 351 and the second tape 352 can be layered on each other at a location where the banknote 100 is sandwiched and held. On the other hand, from the drum 37 to the second reel 362, the running position of the second tape 352 gradually changes in the Z direction from the location where the second tape 352 and the first tape 351 are layered on each other. The second tape 352 is wound on the second reel 362 in this manner. The first to third crowned pulleys 61, 62, and 63 serve as the changing mechanism that is arranged in the second tape path 52 and which changes the position of the second tape 352 to a direction parallel to the axis of the drum 37. The running direction of the second tape 352 is inclined with respect to the plane perpendicular to the axis of the drum 37 at least between adjacent ones of the first to third crowned pulleys 61, 62, and 63.

(Variation of Changing Mechanism)

In each of the example configurations described above, the changing mechanism is configured to change, among the first tapes 351 and the second tapes 352, the position of the tapes on the outer sides in the Z direction toward the center side in the Z direction. However, the changing mechanism may be configured to change, among the first tapes and the second tapes, the position of the tapes disposed closer to the center side in the Z direction toward the outer sides in the Z direction.

The changing mechanism may also be configured to layer two tapes on each other by changing the position of tape on the outer side in the Z direction toward the center side in the Z direction and changing the position of the tape on the center side in the Z direction to the outer side in the Z direction. That is, the changing mechanism may be configured to layer the two tapes on each other by changing the positions of the respective two tapes.

Further, as shown in FIG. 4, in the configuration described above, the plurality of first guide pulleys 392 and the plurality of second guide pulleys 393 are disposed so as to be symmetrical with respect to the plane perpendicular to the axis of the drum 37 and intersecting with the center of the drum 37. In this configuration, the changing mechanism changes the position of each of the two second tapes 352 on the outer sides in the Z direction to the center side in the Z direction. However, the first guide pulleys 392 and the second guide pulleys 393 do not have to be plane-symmetrical. In the sets of tapes, that is, the set of the first tape 351 and the second tape 352 disposed on the right side with respect to the center of the drum 37 and the set of the first tape 351 and the second tape 352 disposed on the left side with respect to the center of the drum 37, the changing mechanism may change the positions of the tapes to the same side in the Z direction.

For example, in the set of the first tape 351 and the second tape 352 disposed on the left side with respect to the center of the drum 37, the second tape 352 is disposed on the outer side in the Z direction and the first tape 351 is disposed on the center side in the Z direction. The changing mechanism changes the position of the second tape 352 from the outer side to the center side in the Z direction. On the other hand, in the set of the first tape 351 and the second tape 352 disposed on the right side with respect to the center of the drum 37, the second tape 352 is disposed on the center side in the Z direction and the first tape 351 is disposed on the outer side in the Z direction. The changing mechanism changes the position of the second tape 352 from the center side to the outer side in the Z direction. Alternatively, in the set of the first tape 351 and the second tape 352 disposed on the left side with respect to the center of the drum 37, the second tape 352 may be disposed on the center side in the Z direction and the first tape 351 may be disposed on the outer side in the Z direction. The changing mechanism changes the position of the second tape 352 from the center side to the outer side in the Z direction. On the other hand, in the set of the first tape 351 and the second tape 352 disposed on the right side with respect to the center of the drum 37, the second tape 352 is disposed on the outer side in the Z direction and the first tape 351 is disposed on the center side in the Z direction. The changing mechanism changes the position of the second tape 352 from the outer side to the center side in the Z direction.

Instead of changing the position of the tape in the Z direction such that the first tape 351 and the second tape 352 completely lie on each other, the changing mechanism may change the position of the tape in the Z direction such that the first tape 351 and the second tape 352 at least partially overlap each other.

(Variation of Reels and Tapes)

The banknote may be wound on the drum 37 using a single set of the first tape 351 and the second tape 352. Such a configuration is useful in short edge feed of a banknote. For example, the first tape 351 may be disposed on the center of the drum 37, and the second tape 352 may be disposed on the right side or the left side of the drum 37. The changing mechanism may change the position of the second tape 352 from the outer side to the center side in the Z direction. Alternatively, the first tape 351 and the second tape 352 may be disposed respectively on both sides with respect to the center of the drum 37. The changing mechanism may change the position of each of the first tape 351 and the second tape 352 from the outer side to the center side in the Z direction.

Further, the reels may be disposed such that the first tape path 51 and the second tape path 52 have approximately the same length. In this configuration, the first tape 351 and the second tape 352 may have the same length. In particular, such a configuration may be implemented if the first reel 361 and the second reel 362 are disposed in the first region 311 and if the first reel 361 and the second reel 362 are disposed on the opposite side from the outlet/inlet 310 with the drum 37 interposed therebetween. In such a case, too, the axes of the first reel 361 and the second reel 362 may be aligned in the same straight line by disposing the changing mechanism in at least one of the first tape path or the second tape path.

(Another Example Configuration Advantageous in Downsizing Banknote Storing Unit)

Figure 8:
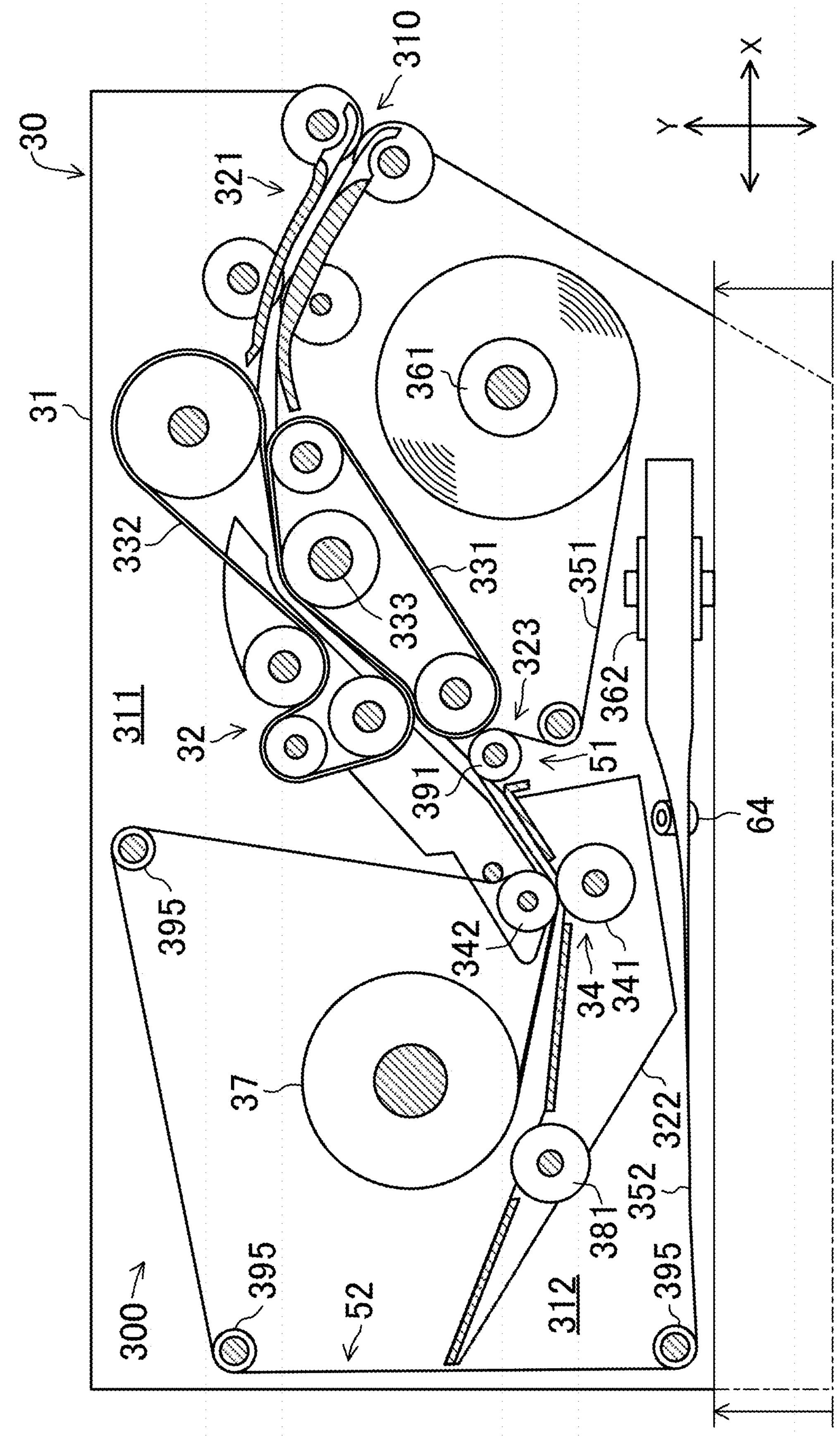
FIG. 8 is a diagram illustrating another variation of the banknote storing unit.

FIG. 8 illustrates another example configuration of a banknote storing unit 30. In the banknote storing unit 30, the configurations that are the same as those of the banknote storing unit 3 shown in FIG. 3 are indicated with the same reference characters. In the banknote storing unit 30, the axis of the second reel 362 is set in a direction parallel to the plane perpendicular to the axis of the first reel 361. Since the second reel 362 is laid horizontally, the banknote storing unit 30 may be downsized like the above-described banknote storing unit 3 (see the up-pointing arrows in FIG. 8).

Since the second reel 362 is laid horizontally, a twist pulley 64 for guiding, through twisting, the second tape 352 unwound from the second reel 362 is arranged in the second tape path 52.

Further, the banknote storing unit 30 does not include a changing mechanism changing the position of the tape. For this reason, instead of the first guide pulley 392, the second guide pulley 393, and the third guide pulley 394, a plurality of bypass pulleys 395 comprise the second tape path 52. The axes of the bypass pulleys 395 are arranged parallel to the axis of the first reel 361 and the axis of the drum 37. The bypass pulleys 395 allow the second tape 352 to bypass the drum 37.

Instead of arranging the axis of the second reel 362 to be orthogonal to the axis of the first reel 361, the axis of the second reel 362 may be inclined at an appropriate angle depending on the shape and size of the vacant space in the banknote storing unit 30.

The temporary storage unit 6 of the banknote handling apparatus 1 may have the same configuration as that of the banknote storing unit 3 shown in FIGS. 3 to 7 or as that of the banknote storing unit 30 shown in FIG. 8. The temporary storage unit 6 is one example of a sheet storing unit.

The technique disclosed herein is not limited to the application to the banknote handling apparatus and the banknote storing unit. The technique disclosed herein may be widely applied to a sheet handling apparatus that handles sheets, such as checks, coupons, and various kinds of securities, and to a sheet storing unit.

Figure 9:
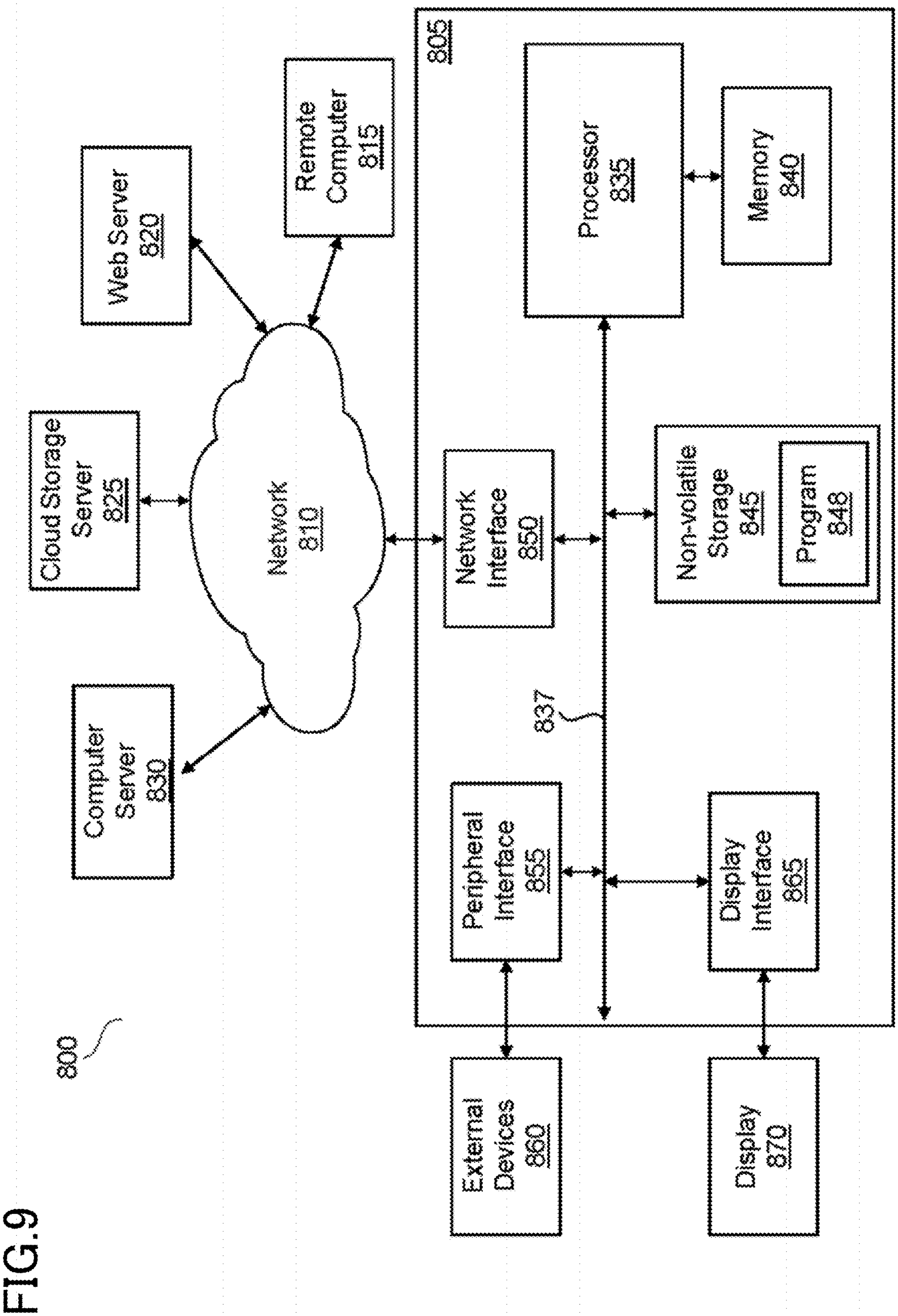
FIG. 9 is a diagram of programmable circuitry in the form of a computer configured to implement the control operations described herein.

FIG. 9 illustrates a block diagram of a computer that may implement the various embodiments of the control unit 805, as described herein. The present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations), flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C # or similar programming languages. The computer readable program instructions may execute entirely on a users personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 9 is a functional block diagram illustrating a networked system 800 of one or more networked computers and servers, any one of which, or combinations of which may be the control unit 805 (FIG. 1). In an embodiment, the hardware and software environment illustrated in FIG. 9 may provide an exemplary platform for implementation of the software and/or methods according to the present disclosure. Referring to FIG. 9, a networked system 800 may include, but is not limited to, computer 805, network 810, remote computer 815, web server 820, cloud storage server 825 and computer server 830. In some embodiments, multiple instances of one or more of the functional blocks illustrated in FIG. 9 may be employed.

Additional detail of computer 805 is shown in FIG. 9. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805. Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm. Bus 837 may be a proprietary or industry standard high-speed parallel or serial peripheral interconnect bus, such as ISA, PCI, PCI Express (PCI-e), AGP, and the like. Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage, and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

The invention claimed is:

1. A sheet storage device, comprising:
- a first reel that is disposed along a first axis and around which a first tape is wound;
- a second reel that is disposed along a second axis and around which a second tape is wound;
- a drum that is disposed along a third axis so as to wound a sheet on an outer peripheral surface of the drum together with the first tape and the second tape, wherein the first tape overlaps the second tape on the outer peripheral surface of the drum and the sheet is sandwiched between the first tape and the second tape;
- a first tape path between the first reel and the drum;
- a second tape path between the second reel and the drum; and
- a changing mechanism disposed in at least one of the first tape path or the second path, the changing mechanism changing a position of a corresponding tape to a direction parallel to the third axis, wherein
- the first reel and the second reel are displaced in a direction parallel to the third axis.

2. The sheet storage device of claim 1, wherein the first axis and the second axis are a same axis.

3. The sheet storage device of claim 1, wherein the first reel and the second reel are supported on one shaft.

4. The sheet storage device of claim 1, wherein
- the changing mechanism is disposed in the second tape path, and
- the second tape path has a longer path length than the first tape path.

5. The sheet storage device of claim 4, wherein the second tape path is provided so as to surround the drum.

6. The sheet storage device of claim 4, wherein
- the changing mechanism has at least one crowned pulley for guiding the tape, and
- between the second reel and the drum, the crowned pulley is displaced with respect to the second reel in the direction parallel to the third axis.

7. The sheet storage device of claim 1, wherein
- the changing mechanism includes a first guide pulley for guiding the tape,
- the first axis, the second axis and the third axis are parallel to each other, and
- an axis of the first guide pulley is inclined with respect to the first axis, the second axis, and the third axis.

8. The sheet storage device of claim 7, wherein
- the changing mechanism further includes a second guide pulley,
- the first guide pulley and the second guide pulley are disposed along a tape path at an interval from each other, and
- an axis of the first guide pulley and an axis of the second guide pulley are disposed to be parallel with each other.

9. The sheet storage device of claim 1, further comprising:
- a plurality of sets of reels including a first set of reels, the first set of reels including the first reel and the second reel.

10. The sheet storage device of claim 9, wherein two sets included in the plurality of sets of reels are disposed so as to be symmetrical with respect to a plane perpendicular to the third axis and intersecting with a center of the drum.

11. The sheet storage device of claim 1, wherein the first reel and the second reel are disposed in the direction parallel to the third axis so as to be within a width of the drum in a direction of the third axis.

12. A sheet storage device, comprising:
- a first reel around which a first tape is wound;
- a second reel that is disposed so as to be coaxial with the first reel, and around which a second tape is wound;
- a drum disposed to wound a sheet on an outer peripheral surface of the drum together with the first tape and the second tape, wherein the first tape overlaps the second tape on the outer peripheral surface of the drum and the sheet is sandwiched between the first tape and the second tape;
- a first tape path between the first reel and the drum; and
- a second tape path between the second reel and the drum.

13. A sheet processing device, comprising:
- an inlet to receive a sheet; and
- a storage device for the sheet, the storage device including
  - a first reel around which a first tape is wound;
  - a second reel around which a second tape is wound;
  - a drum disposed to wound a sheet on an outer peripheral surface of the drum together with the first tape and the second tape, wherein the first tape overlaps the second tape on the outer peripheral surface of the drum and the sheet is sandwiched between the first tape and the second tape;
  - a first tape path between the first reel and the drum;
  - a second tape path between the second reel and the drum; and a changing mechanism disposed in at least one of the first tape path or the second path, the changing mechanism changing a position of a corresponding tape to a direction parallel to an axis of the drum, wherein the first reel and the second reel are displaced in a direction parallel to the axis of the drum.

14. The sheet processing device of claim 13, wherein the changing mechanism is disposed in the second tape path, and the second tape path has a longer path length than the first tape path.

15. The sheet processing device of claim 14, wherein the second tape path is provided so as to surround the drum.

16. The sheet processing device of claim 14, wherein the changing mechanism has at least one crowned pulley for guiding the tape, and between the second reel and the drum, the crowned pulley is displaced with respect to the second reel in a direction parallel to an axis of the drum.

17. The sheet processing device of claim 13, wherein the changing mechanism includes a first guide pulley for guiding the tape, and an axis of the first guide pulley is inclined with respect an axis of the drum.

18. The sheet processing device of claim 17, wherein the changing mechanism further includes a second guide pulley, the first guide pulley and the second guide pulley are disposed along a tape path at an interval from each other, and an axis of the first guide pulley and an axis of the second guide pulley are disposed to be parallel with each other.

19. The sheet processing device of claim 13, further comprising:

a plurality of sets of reels including a first set of reels, the first set of reels including the first reel and the second reel.

20. A sheet processing device, comprising:

an inlet to receive a sheet; and a storage device for the sheet, the storage device including:

a first reel around which a first tape is wound;

a second reel that is disposed so as to be coaxial with the first reel, a second tape is wound around the second reel;

a drum disposed to wound a sheet on an outer peripheral surface of the drum together with the first tape and the second tape, wherein the first tape overlaps the second tape on the outer peripheral surface of the drum and the sheet is sandwiched between the first tape and the second tape;

a first tape path between the first reel and the drum; and a second tape path between the second reel and the drum.

* * * * *